Feb. 12, 1952 A. MARSHALL 2,585,812
COMBINATION SMOKER'S PIPE AND BOWL CLEANER THEREFOR
Filed May 2, 1949

INVENTOR.
Allan Marshall
BY
Attorney

Patented Feb. 12, 1952

2,585,812

UNITED STATES PATENT OFFICE 2,585,812

COMBINATION SMOKER'S PIPE AND BOWL CLEANER THEREFOR

Allan Marshall, Whiting, Ind.

Application May 2, 1949, Serial No. 90,844

3 Claims. (Cl. 131—184)

1

My invention relates to combination smoker's pipe and pipe-bowl scraper means.

A prime object of my invention is to provide combination smoker's pipe and pipe bowl scraper means, the scraper means thereof having the function of keeping the pipe bowl cavity free of the ashes and dottle that customarily cake the surface thereof.

A further important object of my invention is to provide a device of the above described character having scraper manipulating means in connection therewith for rotating the said scraper means, in the operation of cleaning the pipe bowl cavity.

A still further object of my invention is to provide combination smoker's pipe and pipe bowl scraper means, the scraper assembly of which is removable from the pipe bowl for cleaning.

A further object of my invention is to provide a pipe bowl scraper assembly of the above described character that is attachable to the bowls of various types of smokers' pipes, and that may be economically produced in quantities.

Other objects and advantages embraced in my invention will be disclosed in the following description and the accompanying illustrations, wherein like parts are designated by like numerals and in which.

Figures 1, 2, 3, 4:
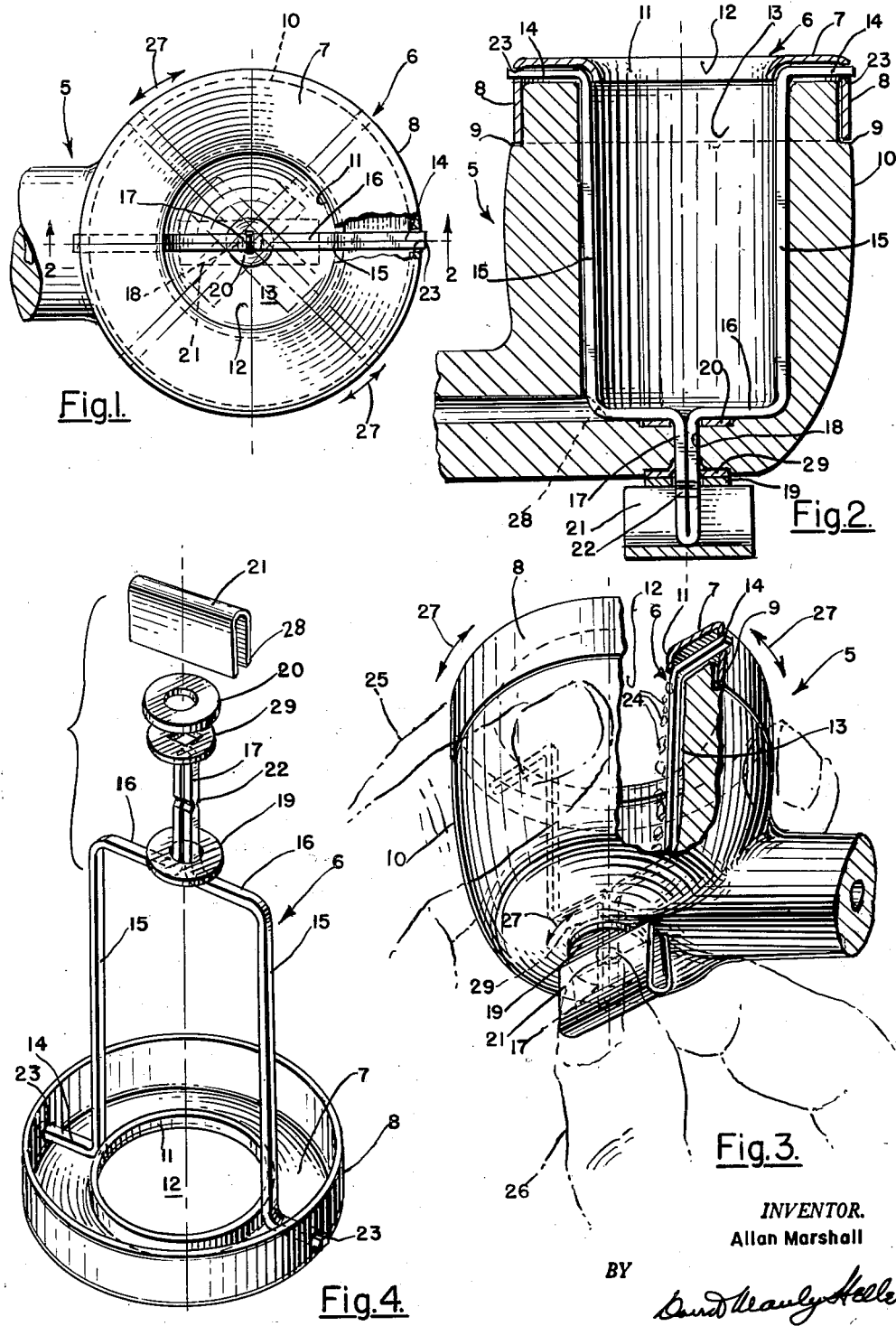
Fig. 1 is a top view of my invention with parts broken and cut away to show the scraper assembly mounting within the smoker's pipe bowl.
Fig. 2 is a cross-sectional view of my invention taken substantially on line 2—2 on Fig. 1.
Fig. 3 is a perspective view of my invention with parts broken away, showing the pipe bowl scraper assembly being manipulated to clean the pipe bowl cavity by hands, drawn in phantom lines.
Fig. 4 is a perspective exploded view of the pipe bowl scraper assembly of my invention.

Referring to the illustrations, my invention is generally designated 5 and consists of a pipe bowl scraper assembly 6 and a pipe bowl 10. The said pipe bowl 10 has a reduced bearing portion 9 to provide bearing and support for the apron portion 8 of the pipe bowl scraper supporting guide 7, which has a lip portion 11, defining the opening 12 of the scraper support.

A U-shaped rotatable scraper element 15 has transverse extensions 14 supported by scraper securing holes 23 in apron 8. The said U-shaped rotatable scraper element 15 is mounted within pipe bowl cavity 13, in contact with the inner surface thereof.

Shoulder scraping portions 16 of U-shaped rotatable scraper element 15 are bent downwardly

2 to form a central pivotal extension 17, which is pivotably supported within a central opening 18 in the bottom of pipe bowl 10. A sealing gasket 29 fits securely over pivotal extension 17 on the outside surface of pipe bowl 10, and washers 19 and 20, one inside and one outside of pipe bowl 10, provide additional bearing means for the pivotal extension 17. The pivotal extension 17 itself is substantially of U-shape as seen in Fig. 2.

The scraper assembly 6 is held in position within pipe bowl cavity 13 by a scraper manipulating and locking clip 21, provided with inwardly inclined resilient lip portions 28 secured to pivotal extension 17 and maintained in place by clip locating notches 22 thereon.

A pipe bowl 10 may be specially manufactured with a reduced bearing portion 9 and a central opening 18 for use in connection with my scraper assembly 6, or said scraper assembly 6 may be adapted for use with most of the pipe bowls in common use merely by providing bearing and support means for the scraper assembly.

The scraper assembly 6 of my invention is attached to the pipe bowl 10 by inserting pivotal extension 17 through central opening 18 in the bottom of pipe bowl 10, and locking the said scraper assembly securely in place by scraper manipulating and locking clip 21 being clipped over the protruding end of pivotal extension 17 and located by clip locating notches 22.

In position, the U-shaped rotatable scraper element 15 will be in contact with the sides of pipe bowl cavity 13 and the shoulder scraping portion 16 will be in contact with the bottom of the said pipe bowl cavity 13. The said U-shaped rotatable scraper element 15 would preferably have flat sides to provide a scraping edge and a scraping surface for the caked dottle and ashes 24, which form upon the inner surface of a pipe bowl cavity as the pipe is smoked.

Fig. 3 illustrates the operation of my invention in which pipe bowl 10 is shown being held by thumb and fingers 25 of one hand as the scraper manipulating and locking clip 21 is grasped by thumb and finger 26 of the other hand and rotated in the direction of arrows 27. As the scraper element 15 is rotated, the dottle and ashes 24 are scraped from the sides and bottom of pipe bowl cavity 13 and are also removed from the smoke duct orifice 28.

The scraper assembly of my invention in no way interferes with the filling of pipe bowl cavity 13 with tobacco or with the smoking thereof.

A most important advantage in connection with my invention is the ease and quickness with which a pipe bowl may be cleaned, before and after each smoking operation, thus keeping the original size to the pipe bowl cavity 13, as well as its original finishing coat which is intended to improve the flavor of the tobacco smoked and which, under ordinary circumstances, becomes coated with a thick cake of packed pipe dottle and ashes.

The U-shaped rotatable scraper element of my invention is so designed to exactly fit the inner surface of pipe bowl cavity 13, providing scraping facilities for every part thereof.

Although I have herein described rather succinctly the nature and use of my invention so that persons skilled in the art will have no difficulty apprising themselves of the teachings thereof and, inasmuch as the disclosure is susceptible of various alterations, modifications, and improvements, I hereby reserve the right to all modifications, alterations and improvements falling within the scope and spirit of my invention, as well as any modifications that are embraced suggestively in the accompanying drawings, and any that may come within the purview of the foregoing description; my invention to be limited only by the appended claims.

Having thus disclosed and revealed my invention, what I claim as new and desire to secure by Letters Patent is:

1. Pipe bowl scraper means for a bowl having an opening through the bottom wall thereof comprising, pipe bowl scraper supporting guide means adapted to be fitted to the mouth of a pipe bowl and adapted to be rotated thereon, U-shaped scraper means having a pivotal extension at the bottom portion thereof rotatably secured through said opening in the bottom of the said pipe bowl, the said U-shaped scraper means and the said pivotal extension thereof comprising a unitary member wherein the said extension is also U-shaped, the said U-shaped scraper means being provided with transverse extensions, said supporting guide means having openings to receive said transverse extensions, and scraper manipulating and locking clip means removably secured to a portion of the said pivotal extension which projects outside the said pipe bowl, said pivotal extension having transverse notches on opposite sides thereof and said clip means having portions thereof adapted to engage said notches, and sealing and bearing means between the said clip and the bottom surface of the said bottom wall whereby said clip will maintain the said scraper means in operative relation to the inner wall of the said bowl, and said transverse extensions will also maintain said guide means in operative relation to the mouth of the said bowl.

2. Pipe bowl scraper means comprising, pipe bowl scraper supporting guide means adapted to be fitted to the mouth of a pipe bowl and adapted to be rotated thereon, the said pipe bowl being provided with a central opening in its bottom portion, U-shaped scraper means having a pivotal extension at the bottom portion thereof rotatably secured through said opening in the bottom of the said pipe bowl, the said U-shaped scraper means and the said pivotal extension thereof comprising a unitary member wherein the said extension is also U-shaped, the said U-shaped scraper means being provided with transverse extensions, said supporting guide means having openings to receive said transverse extensions, scraper manipulating and locking clip means provided with resilient lips and removably secured to a portion of the said pivotal extension which projects outside the said pipe bowl, said pivotal extension having a portion thereof provided with oppositely positioned notches, and said clip means when in assembled position on the pivotal extension has its resilient lips positioned in said notches, and sealing and bearing means between the said clip and the bottom surface of the said bottom wall whereby said clip will maintain the said scraper means in operative relation to the inner wall of the said bowl, and said transverse extensions will also maintain said guide means in operative relation to the mouth of the said bowl.

3. In combination, a pipe having a pipe bowl, and pipe bowl scraper means comprising, pipe bowl scraper supporting guide means positioned in the mouth of the said pipe bowl and adapted to be rotated thereon, the said pipe bowl being provided with a central opening in its bottom portion, U-shaped scraper means having a pivotal extension at the bottom portion thereof rotatably secured through said opening in the bottom of the said pipe bowl, the said U-shaped scraper means and the said pivotal extension thereof comprising a unitary member wherein the said extension is also U-shaped, the said U-shaped scraper means being provided with transverse extensions, said guide means having openings receiving the said transverse extensions, said pivotal extension having sealing and bearing means thereon and notches on opposite sides thereof, and scraper manipulating and locking clip means provided with inwardly inclined lips removably secured in the notches to a portion of the said pivotal extension which projects outside the said pipe bowl whereby said lips will engage said bearing means to hold the scraper in operative relation to the bowl and simultaneously maintain the said guide means in operative relation to the mouth of the said bowl.

ALLAN MARSHALL.

REFERENCES CITED

The following references are of record in the file of this patent:

UNITED STATES PATENTS

| Number | Name | Date |
|---|---|---|
| 748,241 | Walter | Dec. 29, 1903 |
| 793,470 | Schibler | June 27, 1905 |
| 884,057 | Wallen | Apr. 7, 1908 |
| 1,575,099 | Corson | Mar. 2, 1926 |
| 1,605,152 | Weber | Nov. 2, 1926 |
| 1,705,205 | Reams | Mar. 12, 1929 |
| 1,794,002 | Deus | Feb. 24, 1931 |
| 1,960,318 | Segal | May 29, 1934 |
| 2,106,774 | Tarbox | Feb. 1, 1938 |